United States Patent
Yamaoka et al.

(10) Patent No.: US 9,937,620 B2
(45) Date of Patent: Apr. 10, 2018

(54) ROBOT SYSTEM HAVING FUNCTION TO CALCULATE POSITION AND ORIENTATION OF SENSOR

(71) Applicant: FANUC CORPORATION, Yamanashi (JP)

(72) Inventors: Nobuaki Yamaoka, Yamanashi (JP); Wenjie Chen, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/281,084

(22) Filed: Sep. 30, 2016

(65) Prior Publication Data

US 2017/0106535 A1    Apr. 20, 2017

(30) Foreign Application Priority Data

Oct. 15, 2015 (JP) .................. 2015-203902

(51) Int. Cl.
 *B25J 9/00* (2006.01)
 *B25J 9/16* (2006.01)
 *B25J 13/08* (2006.01)

(52) U.S. Cl.
 CPC ........... *B25J 9/1651* (2013.01); *B25J 9/1692* (2013.01); *B25J 13/088* (2013.01); *B25J 13/089* (2013.01); *G05B 2219/39017* (2013.01); *G05B 2219/39058* (2013.01)

(58) Field of Classification Search
 CPC ...... B25J 9/1651; B25J 9/1692; B25J 13/089; B25J 13/088; G05B 2219/39058; G05B 2219/39017
 See application file for complete search history.

(56) References Cited

U.S. PATENT DOCUMENTS

| 9,283,682 B2* | 3/2016 | Takahashi | B25J 9/1692 |
| 9,366,285 B2* | 6/2016 | Sporer | A61B 90/25 |
| 9,415,518 B2* | 8/2016 | Motoyoshi | B25J 9/1641 |
| 2013/0205558 A1* | 8/2013 | Sporer | F16M 11/10 29/407.01 |

(Continued)

FOREIGN PATENT DOCUMENTS

| CN | 102785046 B | 5/2015 |
| JP | 4283214 B2 | 6/2009 |

(Continued)

OTHER PUBLICATIONS

Wang Dong et al. "The Research on the accuracy of robots based on a model of accuracy", Jan. 14, 2014, p. 93-98, vol. 24. 6pp.

*Primary Examiner* — Jason Holloway
(74) *Attorney, Agent, or Firm* — Hauptman Ham, LLP

(57) ABSTRACT

A robot control device which controls a robot includes a sensor coordinate system calculation unit which calculates a position and an orientation of a sensor by making the robot perform a predetermined operation. The sensor coordinate system calculation unit comprises an operation parameter optimization unit which is configured to obtain a combination most suitable for calculating the position and orientation of the sensor, from a plurality of combinations of modified values of a predetermined type of operation parameters, by making the robot perform the predetermined operation, successively using each of the combinations.

5 Claims, 4 Drawing Sheets

(56) References Cited

U.S. PATENT DOCUMENTS

| | | | | |
|---|---|---|---|---|
| 2014/0060233 A1* | 3/2014 | Gomi | ............ | B25J 9/1638 |
| | | | | 74/490.05 |
| 2015/0120053 A1* | 4/2015 | Motoyoshi | ............ | B25J 9/1641 |
| | | | | 700/258 |
| 2016/0270874 A1* | 9/2016 | Sporer | ............ | F16M 11/10 |
| 2016/0375581 A1* | 12/2016 | Niu | ............ | B25J 9/1638 |
| | | | | 700/258 |

FOREIGN PATENT DOCUMENTS

| | | |
|---|---|---|
| JP | 2011-167817 A | 9/2011 |
| JP | 2011-230245 A | 11/2011 |
| JP | 2011-238097 A | 11/2011 |
| JP | 2013-41478 A | 2/2013 |

\* cited by examiner

ROBOT SYSTEM HAVING FUNCTION TO CALCULATE POSITION AND ORIENTATION OF SENSOR

RELATED APPLICATIONS

The present application claims priority to Japanese Patent Application Number 2015-203902 filed Oct. 15, 2015, the disclosure of which is hereby incorporated by reference herein in its entirety.

BACKGROUND OF THE INVENTION

1. Field of the Invention

The present invention relates to a robot system having a learning control function, and more specifically, the present invention relates to a robot system having a function to calculate a position and an orientation of a sensor attached to a movable part of the robot.

2. Description of the Related Art

In general, in a robot, a position feedback control, a speed feedback control, and a current feedback control are carried out to control the position and speed of an arm portion which is driven by a servo motor in accordance with commands. However, even if such feedback controls were carried out, there are cases when the arm portion vibrates during operation.

Therefore, conventionally, an acceleration sensor is attached to a movable part of the robot, e.g., a tip of the arm portion, vibration of the arm portion during operation is measured by the acceleration sensor so as to perform a learning control and thereby reduce the vibration (see Japanese Patent No. 4283214).

Specifically, the tip motion of the arm portion is controlled based on a feedback error (i.e., positional deviation) between position command data of the tip of the arm portion given by an external control unit and actual position data given by a position, detector at the servo motor which drives the arm portion. During the movement, the position data of the tip of the arm portion is acquired based on the measurement result of the acceleration sensor attached to the tip of the arm portion, and an amount of correction corresponding to the vibration error is obtained based on the position data and the aforementioned position command data. The positional deviation is corrected taking the amount of correction into account. Note that, the learning control mentioned above refers to a control to reduce the vibration by repeatedly performing a series of processes as mentioned above.

In order to perform the aforementioned learning control, it is necessary to attach the acceleration sensor to the tip of the arm portion and carry out calibration for obtaining the position and orientation of the attached acceleration sensor. With respect to this matter, Japanese Patent Application Laid-open No. 2013-041478 discloses a method for automatically calculating the position and orientation of an acceleration sensor provided at the tip of the arm portion by performing a predetermined operation of a robot.

Specifically, in a robot disclosed in Japanese Patent Application Laid-open No. 2013-041478, an acceleration sensor is attached to the tip of the arm portion, and the tip of the arm portion is translated in each of the X-axis direction and the Y-axis direction of a specific coordinate system, and thereby, the orientation of the acceleration sensor is presumed. Furthermore, the two articulated shafts that are provided on the tip side of the arm portion are rotated, and thereby, the position of the acceleration sensor is presumed.

However, in the robot disclosed in Japanese Patent Application Laid-open No. 2013-041478, as the weight of a tool attached to the tip of the arm portion increases and as the rigidity of the arm portion decreases, a disturbance applied to the acceleration sensor during the predetermined operation of the robot increases. As a result, the position and orientation of the acceleration sensor may not be calculated with high precision.

As the calculation error becomes large, the effect of reducing the vibration by the aforementioned learning control is reduced and the calculation error sometimes results in divergence of vibration. Furthermore, in the invention disclosed in Japanese Patent Application Laid-open No. 2013-041478, after the position and orientation of the acceleration sensor are automatically calculated, it is necessary for an operator to manually confirm whether or not the calculation result is precise.

SUMMARY OF THE INVENTION

The present invention provides a robot system which is capable of increasing the precision of the calculation result of the position and orientation of a sensor attached to the movable part of the robot and of making the manual confirmation of the calculation precision unnecessary.

According to the first aspect of the invention, there is a robot system comprising a robot having a movable part to which a sensor is attached to monitor at least vibrations, and a control device which controls the operation of the robot, wherein the control device comprises a sensor coordinate system calculation unit which calculates a position and an orientation of the sensor by making the robot perform a predetermined operation, and the sensor coordinate system calculation unit comprises an operation parameter optimization unit which is configured to obtain a combination most suitable for calculating the position and orientation of the sensor, from a plurality of combinations in which a predetermined type of operation parameters were combined at different values, by making the robot perform the predetermined operation, successively using each of the combinations.

According to the second aspect of the invention, in the robot system according to the first aspect of the invention, the predetermined type of operation parameters includes speed and acceleration instructed to the robot by the control device.

According to the third aspect of the invention, in the robot system according to the first or second aspect of the invention, the operation parameter optimization unit is adapted to calculate the position and orientation of the sensor based on data output from the sensor when the predetermined operation is performed by the robot in accordance with each of the combinations and calculate a physical quantity acting on the sensor based on the calculated position and orientation of the sensor and on the position and posture of the robot during the predetermined operation, and the operation parameter optimization unit is adapted to determine a combination in which the calculation precision of the position and orientation of the sensor becomes the highest, from the plurality of combinations, based on the data output from the sensor and the calculated physical quantity acting on the sensor.

According to the fourth aspect of the invention, in the robot system according to any one of the first to third aspects of the invention, the operation parameter optimization unit is adapted to calculate the position and orientation of the sensor based on the data output from the sensor when the predetermined operation is performed in accordance with each combination, calculates a physical quantity acting on the sensor based on the calculated position and orientation of the sensor and on the position and posture of the robot during the predetermined operation, determine a combination in which the calculation precision of the position and orientation of the sensor becomes the highest, from the plurality of combinations, based on the data output from the sensor and the calculated physical quantity acting on the sensor, and judges whether or not the calculation precision of the position and orientation of the sensor is sufficient, and if the calculation precision is judged to be insufficient, accordingly issues an external notification.

According to the fifth aspect of the invention, in the robot system according to any one of the first to fourth aspects, the predetermined operation comprises: translations in at least two axial directions of the X, Y and Z axes of a three dimensional orthogonal coordinate system defined at the movable part; and rotations about at least two of the X, Y and Z axes.

According to the sixth aspect of the invention, in the robot system according to any one of the first to fifth aspects, the sensor is an acceleration sensor, a gyro sensor, an inertia sensor, a force sensor, a laser tracker, a camera, or a motion capture device.

BRIEF DESCRIPTION OF THE DRAWINGS

The aforementioned objects, features and advantageous effects and other objects, features and advantageous effects of the present invention will be more clearly understood from the detailed description of the representative embodiments of the invention illustrated in the accompanying drawings.

Figure 1:
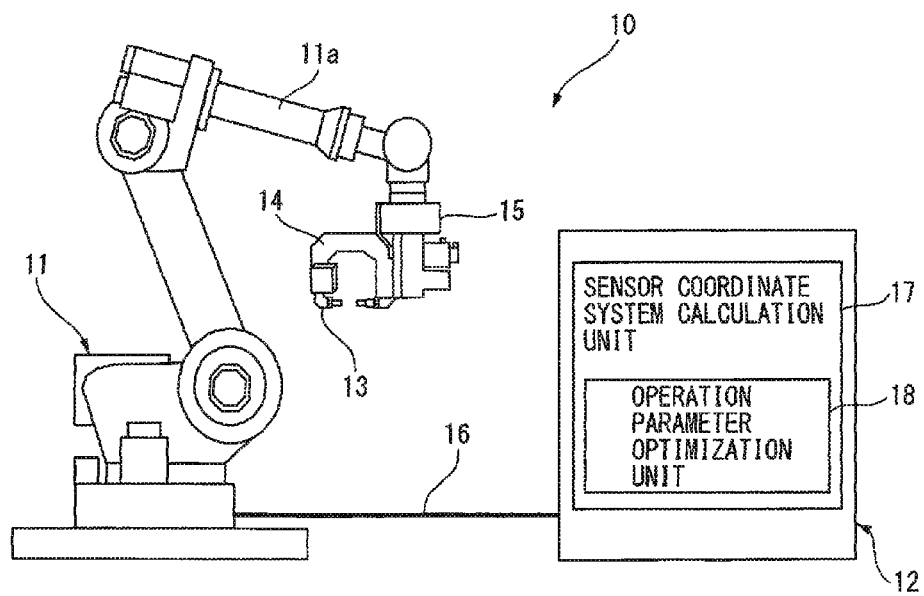
FIG. 1 is a block diagram showing the structure of a robot system according to an embodiment of the present invention.

FIG, 2 is an explanatory view of constituent elements and coordinate systems of an articulated robot shown in FIG. 1.

Figure 3:
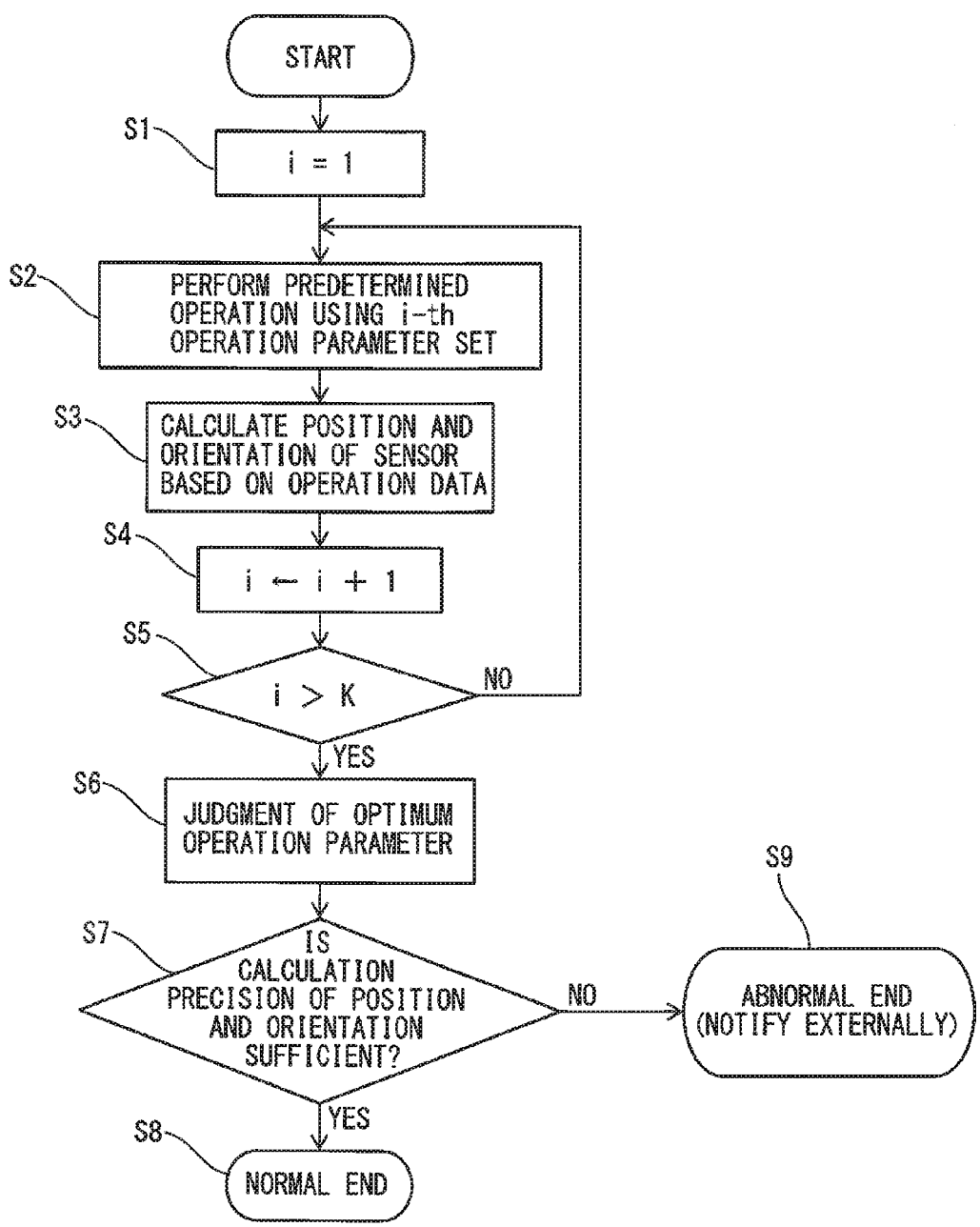

FIG. 3 is a flow chart showing the processes carried out by a sensor coordinate system calculation unit and an operation parameter optimization unit shown in FIG. 1.

Figure 4:
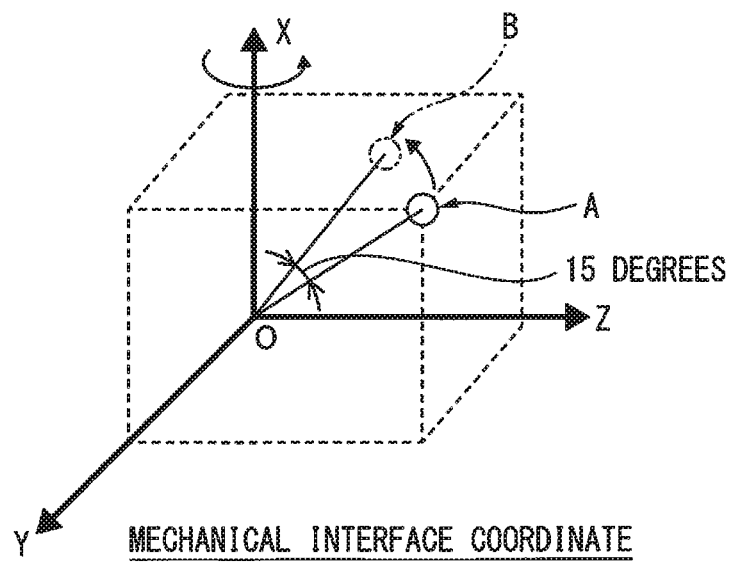

FIG. 4 schematically shows a mechanical interface coordinate system when an acceleration sensor has been rotated by 15 degrees about an X-axis thereof.

Figure 5:
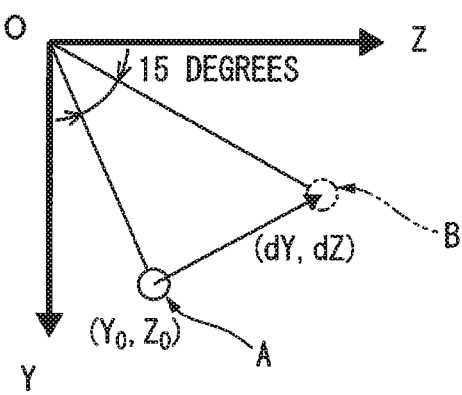

FIG. 5 is a diagram showing the mechanical interface coordinate system shown in FIG. 4, represented by a YZ plane.

Figure 6:
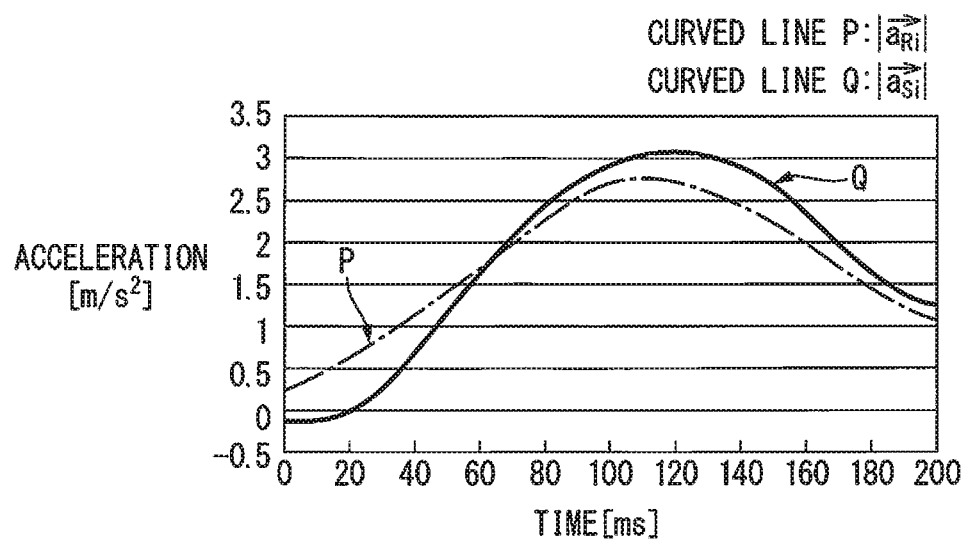

FIG. 6 is a graph showing an example of temporary changes of the accelerations during a predetermined operation.

Figure 7:
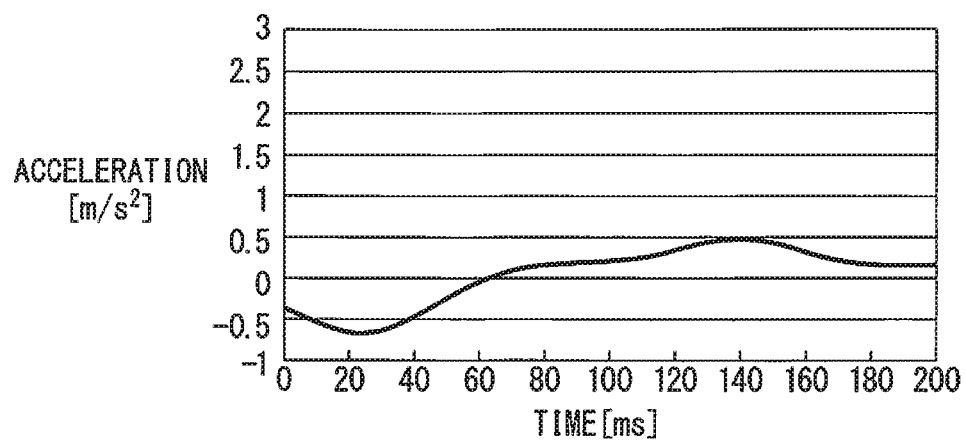

FIG. 7 is a graph showing an example of a temporary change of a difference between the calculated values of the acceleration acting on the acceleration sensor and the output values of the acceleration sensor.

DETAILED DESCRIPTION

Embodiments of the present invention will, be discussed below with reference to the drawings. In the drawings, the same components are assigned the same reference numerals. The components assigned the same reference numerals in different drawings have the same function. For easy understanding, the scale of each drawing has been appropriately changed.

Figure 2:
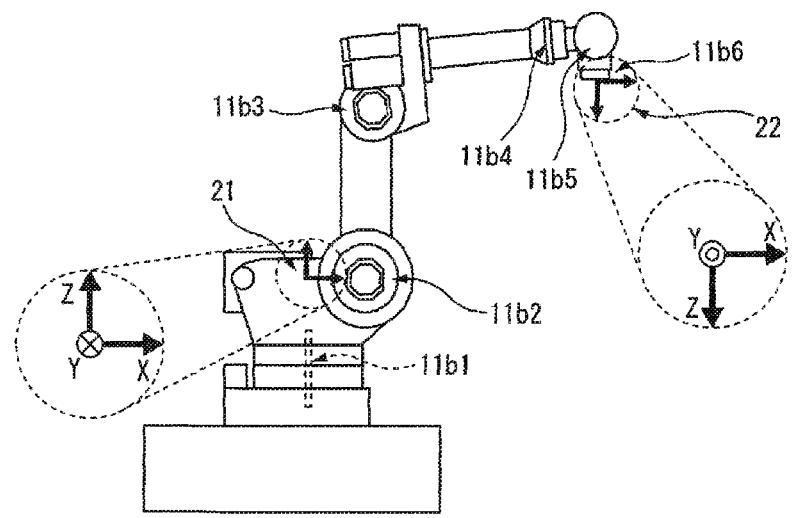

FIG. 1 is a block diagram showing the structure of a robot system according to an embodiment of the present invention. FIG. 2 is an explanatory view of constituent elements and coordinate systems of an articulated robot shown in FIG. 1.

As can be seen in FIG. 1, the robot system 10 of this embodiment is composed of a robot 11 and a robot control device 12 which controls the robot 11.

The robot 11 is, for example, a vertical articulated robot having an acceleration sensor 13 attached to a movable part of the robot which is an object whose position is to be controlled to measure the vibration of the movable part. In this embodiment, a tool 14 is attached to a tip of an arm portion 11a of the robot 11 through a bracket 15, and the acceleration sensor 13 is attached to the tool 14.

The tool 14 may be a robot hand, a bolt fastening tool, or a welding gun, etc. The acceleration sensor 13 may be a tri-axial acceleration sensor.

The robot 11 and the robot control device 12 are connected to each other through a cable 16. The acceleration sensor 13 is also connected to the robot control device 12 through a cable (not shown).

The robot 11 is provided with six joint shafts 11b1 to 11b6 and servo motors (not shown) which rotate the respective joint shafts, as may be seen in FIG. 2. Each of the servo motors is controlled in accordance with the operation commands given by the robot control device 12.

The robot 11 is a representative robot comprising a space-fixed world coordinate system 21, and a mechanical interface coordinate system 22 set at the tip of the arm portion 11a to which the tool 14 is attached. Both the world coordinate system 21 and the mechanical interface coordinate system 22 are three-dimensional orthogonal coordinate systems.

Note that, the directions of the XYZ axes in the world coordinate system 21 and the directions of the XYZ axes in the mechanical interface coordinate system 22 are indicated in partial enlarged views in FIG. 2. In the world coordinate system 21, the +X axis is defined by the right direction in FIG. 2, the +Z axis is defined by the upward direction in FIG. 2, and the +Y axis is defined by the depth direction of the sheet of the drawing of FIG. 2. In the mechanical interface coordinate system 22, the +X axis is defined by the right direction in FIG. 2, the +Z axis is defined by the downward direction in FIG. 2, and the +Y axis is defined by the direction opposite the depth direction of the sheet of the drawing of FIG. 2.

Furthermore, in the robot system 10 of this embodiment, the vibration of the robot 11 during operation is measured by the acceleration sensor 13 attached to the tool 14 at the tip of the arm portion 11a as shown in FIG. 1, and the learning control is performed to reduce the vibration. In order to perform such a learning control, it is necessary to carry out calibration to acquire the position and orientation of the acceleration sensor 13 attached to the tool 14.

The robot control device 12 in this embodiment has a function to automatically calculate the position and orientation of the acceleration sensor 13 attached to the tool 14 by performing a predetermined operation of the robot 11.

Specifically, the robot control device 12 comprises a sensor coordinate system calculation unit 17 as shown in FIG. 1. The sensor coordinate system calculation unit 17 calculates the position and orientation of the acceleration sensor 13 attached to the tool 14 by performing a predetermined operation of the robot 11.

More specifically, the sensor coordinate system calculation unit 17 includes an operation parameter optimization unit 18 as shown in FIG. 1. The operation parameter optimization unit 18 causes the robot to perform predetermined operations by successively using a plurality of combinations in which a predetermined type of operation parameters were combined at different values (which will be referred to as the "operation parameter set"). Consequently, the operation parameter optimization unit 18 obtains an optimum operation parameter set to calculate the position and orientation of the acceleration sensor 13. Examples of the operation parameter set will be discussed hereinafter.

The operations to be carried out by the robot 11 through the operation parameter optimization unit 18 are as follows.

Namely, in this embodiment, the tool 14 to which the acceleration sensor 13 is attached is translated in the directions of the X-axis, Y-axis and Z-axis of the mechanical interface coordinate system 22 with reference to an arbitrary posture of the robot 11. The displacement of each translation is 100 mm. Thereafter, the tool 14 to which the acceleration sensor 13 is attached is rotated about the X-axis, the Y-axis, and the Z-axis of the mechanical interface coordinate system 22. The angular displacement of each rotational movement is 15 degrees.

In order for the robot 11 to perform the predetermined operations mentioned above, K number of operation parameter sets (K is a natural number) are pre-stored in the robot control device 12. The operation parameter sets of the robot control device 12 are preferably externally rewritable.

In this embodiment, a predetermined type of operation parameters which constitute each operation parameter set includes commands of speed and acceleration. given by the robot control device 12 to the robot 11. In this embodiment, each operation parameter set consists of a combination in which values of speed and acceleration were combined at different values. Note that, the values of speed and acceleration of each operation parameter set are determined by ratios to the maximum speed and acceleration of the robot 11. For example, as combinations of speed and acceleration (speed [%], acceleration [%], combinations of (30, 100), (50, 100), (70, 100), (80, 80) and (100, 50) are prepared beforehand. Namely, in the case of translation of 100 mm mentioned above, a moving body is moved from a start point at a predetermined acceleration rate, and thereafter, is moved at a predetermined constant speed, and thereafter is moved at a predetermined deceleration rate to a terminal point.

The processes carried out by the sensor coordinate system calculation unit 17 and the operation parameter optimization unit 18 will be discussed below.

FIG. 3 is a flow chart of the operations performed by the sensor coordinate system calculation unit 17 and the operation parameter optimization unit 18.

The operation parameter optimization unit 18 instructs the robot 11 to carry out the aforementioned predetermined operation using each of a plurality of operation parameter sets, e.g., the aforementioned five operation parameter sets. In this embodiment, as can be seen from steps S1 to S5 shown in FIG. 3, the K (K=5 in this embodiment) number of operation parameter sets are sequentially used to perform the aforementioned predetermined operations.

Moreover, each time the aforementioned predetermined operation is performed using each operation parameter set, the operation parameter optimization unit 18 calculates the position and orientation of the acceleration sensor 13 from the operation data at that time (steps S2 and S3). The calculation method is as follows.

First, the orientation of the acceleration sensor 13 is calculated, and thereafter, the position of the acceleration sensor 13 is calculated.

In the calculation of the orientation of the acceleration sensor 13, acceleration data before the commencement of the aforementioned predetermined operation and acceleration data obtained during the translation motion among the predetermined operations are used. The acceleration data for one minute prior to the commencement of the aforementioned predetermined operation is acquired and an average value thereof is recorded. Regarding the translation motion, the tool 14 is translated in each of the X-axis, Y-axis and Z-axis directions of the mechanical interface coordinate system 22 and the acceleration data in the course of each translation motion is successively recorded at predetermined time intervals. The acceleration data to be recorded is obtained by subtracting the average value of the acceleration data prior to the commencement of the aforementioned predetermined operation from the actual acceleration data detected by the acceleration sensor 13 and removing noise therefrom by a low-pass filter. The reason thereof resides in preventing a noise from increasing on the acceleration data due to two integrals which will be discussed hereinafter. The data is preferably recorded in a memory unit (not shown) provided in the robot control device 12 or an external memory device, etc.

As mentioned above, the acceleration data at each time is subjected to two integrals using time-series acceleration data recorded at predetermined time intervals as mentioned above, and by summing the integral results, the three dimensional displacement of the acceleration sensor 13 which has been translated is obtained. Such a three dimensional displacement of the acceleration sensor 13 is obtained for each translation motion in the X-axis, Y-axis and Z-axis directions of the mechanical interface coordinate system 22.

Next, a unit vector $$\vec{P}_x$$

which represents the direction of the movement, of the acceleration sensor 13 is given by the following equation (1).

$$\vec{P}_x = (P_{xx}, P_{xy}, P_{xz}) = \frac{1}{\sqrt{(x_{xi}^2 + y_{xi}^2 + z_{xi}^2)}}(x_{xi}, y_{xi}, z_{xi}) \quad (1)$$

Note that, $(X_{xi}, Y_{xi}, Z_{xi})$ of equation (1) represents the three dimensional displacement of the acceleration sensor 13 which is obtained by the two integrals of the acceleration data as mentioned above as coordinate values. The subscript x of each coordinate value represents a translation motion in the X-axis direction. The subscript i represents the i-th (i←1 to K) operation parameter set among the K number of operation parameter sets. As can be seen from the equation (1), as the absolute values of $(X_{xi}, Y_{xi}, Z_{xi})$ are a denominator of the equation, the vector $$\vec{P}_x$$

is standardized.

Moreover, regarding the translation motion in the Y-axis direction and Z-axis direction, the unit vectors $$\vec{P}_y, \vec{P}_z$$

are calculated. The calculation equations therefor are represented by the following equations (2) and (3).

$$\vec{P}_y = (P_{yx}, P_{yy}, P_{yz}) = \frac{1}{\sqrt{(x_{yi}^2 + y_{yi}^2 + z_{yi}^2)}}(x_{yi}, y_{yi}, z_{yi}) \quad (2)$$

$$\vec{P_z} = (P_{zx}, P_{zy}, P_{zz}) = \frac{1}{\sqrt{(x_{zi}^2 + y_{zi}^2 + z_{zi}^2)}} (x_{zi}, y_{zi}, z_{zi}) \quad (3)$$

The rotation matrix R which represents the orientation of the acceleration sensor 13 is obtained from the three unit vectors obtained by the equations (1) to (3) using the following equation (4).

$$R = \begin{bmatrix} P_{xx} & P_{yx} & P_{zx} \\ P_{xy} & P_{yy} & P_{zy} \\ P_{xz} & P_{yz} & P_{zz} \end{bmatrix} \quad (4)$$

Note that, the rotation matrix R is obtained from the translation motions in the three directions consisting of X-axis, Y-axis and Z-axis directions, as mentioned above, but may be obtained from the translation motions in at least two axis directions among the three axis directions.

$$\vec{P_z} = \vec{P_x} \times \vec{P_y} \quad (5)$$

Namely, as can be seen from the aforementioned equation (5), it is possible to obtain $$\vec{P_z}$$

from an outer product of vectors $$\vec{P_x}$$

and $$\vec{P_y}$$

The orientation of the acceleration sensor 13 is calculated in the aforementioned method. As a matter of course, the calculation of the sensor is carried out for all of the K number of operation parameter sets.

Next, the position of the acceleration sensor 13 is calculated.

When the position of the acceleration sensor 13 is calculated, the acceleration data which is obtained from the rotational movement among the aforementioned predetermined operations is used. To this end, the acceleration data is successively recorded at predetermined time intervals for the rotation of the tool 14 about each of the X-axis, Y-axis, and Z-axis of the mechanical interface coordinate system 22. Note that the acceleration data to be recorded are those obtained by subtracting the gravitational acceleration from the actual acceleration data detected by the acceleration sensor 13, taking into account the orientation of the acceleration sensor 13 obtained by the equation. (4) above. The data is preferably recorded in a storage unit (not shown) provided in the robot control device 12 or an external memory device, etc.

The acceleration data at each time is subjected to two integrals using time-series acceleration data recorded at predetermined time intervals as mentioned above. The angular displacement of the acceleration sensor 13 which has been rotated is obtained by summing up the integral results.

The angular displacement of the acceleration sensor 13 is obtained for each of the rotations about the X-axis, Y-axis and Z-axis of the mechanical interface coordinate system 22.

The Y component and Z component of the position of the acceleration sensor 13 are obtained from the angular displacement of the acceleration sensor 13 about the X-axis. Likewise, the X component and Z component of the position of the acceleration sensor 13 are obtained from the angular displacement of the acceleration sensor 13 about the Y-axis, and the X component and Y component of the position of the acceleration sensor 13 are obtained from the angular displacement of the acceleration sensor 13 about the Z-axis.

The aforementioned rotational motion about the X-axis will be discussed below as a representative example.

FIG. 4 schematically shows the mechanical interface coordinate system 22 when the acceleration sensor 13 has been rotated by 15 degrees about the X-axis of the mechanical interface coordinate system 22. In FIG. 4, the symbol "A" represents the position of the acceleration sensor 13 before rotation and the symbol represents the position of the acceleration sensor 13 after rotation. FIG. 5 schematically shows the mechanical interface coordinate system 22 of FIG. 4, in terms of a YZ plane.

As can be seen in FIG. 5, when the position "A" of the acceleration sensor 13 in the mechanical interface coordinate system 22 is represented by $(Y_0, Z_0)$, it is assumed that the acceleration sensor 13 has been rotated by 15 degrees about the X-axis to the position B with the displacement of (dY, dZ). In this case, the coordinates $(Y_0, Z_0)$ which represent the position "A" and the coordinates (dY, dZ) which represent the displacement have the following relationship therebetween.

$$\begin{bmatrix} Y_0 + dY \\ Z_0 + dZ \end{bmatrix} = \begin{bmatrix} \cos 15° & -\sin 15° \\ \sin 15° & \cos 15° \end{bmatrix} \begin{bmatrix} Y_0 \\ Z_0 \end{bmatrix} = \begin{bmatrix} 0.966 & -0.259 \\ 0.259 & 0.966 \end{bmatrix} \begin{bmatrix} Y_0 \\ Z_0 \end{bmatrix} \quad (6)$$

The coordinates (dY, dZ) in the equation (6) above represent the angular displacement of the acceleration sensor 13 about the X-axis, obtained by the two integrals of the acceleration data as mentioned above. Therefore, the coordinates $(Y_0, Z_0)$ can be calculated by substituting the respective values of dY and dZ which have been already obtained in the aforementioned. equation (6). Thus, the Y component and Z component of the position of the acceleration sensor 13 can be obtained from the rotational motion about the X-axis With the same calculation method as above, the two dimensional position of the acceleration sensor 13 before rotation can be obtained for the rotation about the Y-axis and the rotation about the Z-axis. Namely, the X component and Z component of the position of the acceleration sensor 13 are obtained by the rotation about the Y-axis. Likewise, the X component and Y component of the position of the acceleration sensor 13 are obtained by the rotation about the Z-axis.

As mentioned above, two X components, two Y components, and two Z components of the position of the acceleration sensor 13 are obtained by the rotations about the three axes. In the illustrated embodiment, the two X components, the two Y components and the two Z components are respectively averaged to calculate the three dimensional position of the acceleration sensor 13.

Note that, the three dimensional position of the acceleration sensor 13, which is obtained from the rotations about three axes of X-axis, Y-axis, and Z-axis in the aforementioned embodiment, may be obtained from the rotations about at least two axes of the three axes.

Namely, the Y component and Z component of the position of the acceleration sensor 13 are obtained from the rotation about the X-axis and the X component and Z component of the position of the acceleration sensor 13 are obtained from the rotation about the Y-axis. Therefore, the Z component of the position of the acceleration sensor 13 to be calculated may be obtained by averaging the two Z components obtained from the rotational motions about the X-axis and the Y-axis. Furthermore, the X component of the position of the acceleration sensor 13 to be calculated may be the X component obtained from the rotational motion about the Y-axis and the Z component of the position of the acceleration sensor 13 to be calculated may be the Y component obtained from the rotational motion about the Y-axis. With reference to FIG. 3 again, after step S3 in which the position and orientation of the acceleration sensor 13 are calculated, the number i is increased by one at step S4. Note that, in this embodiment, the K i.e., 5 in this embodiment) number of operation parameter sets are sequentially assigned serial numbers and the operation parameter set whose serial number corresponds to the aforementioned number i is used.

At step S5, if it is judged that the calculation of the position and orientation of the acceleration sensor 13 has been completed for all of the K number of operation parameter sets, the control proceeds to step S6. At step S6, it is determined as to which of the five operation parameter sets is the optimum operation parameter set to obtain the position and orientation of the acceleration sensor 13.

Specifically, the operation parameter optimization unit 18 determines the optimum operation parameter set as follows.

First, the absolute values of the physical quantity acting on the acceleration sensor 13 at predetermined time intervals, i.e., the accelerations $$\vec{a}_{Ri}$$

are successively calculated based on the position and orientation of the acceleration sensor 13 calculated using the predetermined operation parameter set and the position and posture of the robot 11 during the aforementioned predetermined operation. The absolute value means the square root of the sum of the squares of the three XYZ components.

Specifically, the aforementioned acceleration is calculated by successively obtaining the position of the acceleration sensor 13 at each time from the position and posture of the robot 11 in the world coordinate system at predetermined time intervals during the aforementioned predetermined operations with reference to the calculated position and orientation of the acceleration sensor 13 and by performing two differentials. Note that, the time at which each acceleration is calculated is synchronized with the time at which the acceleration data obtained from the acceleration sensor 13 during the aforementioned predetermined operations is recorded.

The calculation of the acceleration is performed for each of the five number of operation parameter sets.

Next, a standard deviation S of the acceleration $$\vec{a}_{Ri}$$

calculated as above is successively obtained for each of the operation parameters.

$$S = \text{std}|\vec{a}_{Ri}|$$

The aforementioned standard deviation S of the acceleration may be obtained from the output value $$\vec{a}_{Si}$$

of the acceleration sensor 13 during the aforementioned predetermined operation as follows.

$$S = \text{std}|\vec{a}_{Si}|$$

Alternatively, the aforementioned standard deviation S of the acceleration may be obtained from a difference between the maximum value and the minimum value as follows $$S = \max|\vec{a}_{Ri}| - \min|\vec{a}_{Ri}|$$

or $$S = \max|\vec{a}_{Si}| - \min|\vec{a}_{Si}|$$

In the equations above, the term "max" represents the maximum value of the acceleration at each time and the term "min" represents the minimum value of the acceleration at each time.

Note that, FIG. 6 shows an example of temporary changes of the aforementioned accelerations $$\vec{a}_{Si}, \vec{a}_{Ri}$$

Next, a norm N of the difference between the absolute value of the acceleration calculated as above $$\vec{a}_{Ri}$$

e.g., the acceleration data represented by the curved line P in FIG. 6 and the absolute value of the output value of the acceleration sensor 13

$$\vec{a}_{Si}$$

during the aforementioned predetermined operation, e.g., the acceleration data represented by the curved line Q in FIG. 6 is obtained as follows.

$$N = \sqrt{\frac{1}{n}\sum_{i=1}^{n}|\vec{a}_{Ri} - \vec{a}_{Si}|^2}$$

In the above equation, n represents the number of pieces of time-series data, that is, the number of pieces of acceleration data recorded and calculated at predetermined time intervals.

FIG. 7 shows an example of a temporary change of the difference between the absolute value of the aforementioned acceleration $$\vec{a}_{Ri}$$

and the absolute value of the acceleration $$\vec{a}_{Si}$$

The dispersion of the acceleration data (FIG. 6) used to calculate the position and orientation of the acceleration sensor 13 becomes large as the standard deviation S of the acceleration increases. This means that the speed of the predetermined operation performed to obtain the position and orientation of the acceleration sensor 13 is high, and accordingly, the standard deviation S being large is one of the conditions to obtain the position and orientation of the acceleration sensor 13 with high precision.

Moreover, the difference (FIG. 7) between the absolute value of the acceleration $$\vec{a}_{Ri}$$

calculated as above and the absolute value of the output of the acceleration sensor 13

$$\vec{a}_{Si}$$

during the predetermined operation decreases as the aforementioned norm N becomes smaller. Namely, the influence by a disturbance applied to the acceleration sensor 13 during the predetermined operation is reduced. Therefore, the norm N being small is also one of the conditions to obtain the position and orientation of the acceleration sensor 13 with high precision.

As may be understood from the foregoing, the conditions that the aforementioned standard deviation S is large and the aforementioned norm N is small are indispensable to calculate the position and orientation of the acceleration sensor with high precision. To this end, in the illustrated embodiment, the ratio of S and N (S/N) is successively calculated for each of the five number of operation parameter sets.

As an increase in the S/N ratio means an increase in the calculation precision of the position and orientation of the acceleration sensor 13, the operation parameter optimization unit 18 judges that the operation parameter set having the largest S/N ratio is the optimum operation parameter set (step S6 of FIG. 3).

Next, at step S7 of FIG. 3, the operation parameter optimization unit 18 judges whether or not the precision of the calculation result of the position and orientation of the acceleration sensor 13 is sufficient.

Specifically, if the S/N ratio which represents the judgment result at step S6 is greater than a predetermined threshold, it is judged that the calculation precision of the position and orientation of the acceleration sensor 13 is sufficient. In this case, the operation normally ends at step S8 and the operation parameter optimization unit 18 outputs the calculation result of the position and orientation of the acceleration sensor 13 to the outside. Note that, preferably, the operation parameter optimization unit 18 is provided with a setting unit (not shown) for setting the aforementioned threshold which is externally rewritable.

If the S/N ratio which represents the judgment result at step S6 is smaller than the threshold, it is judged that the calculation precision of the position and orientation of the acceleration sensor 13 is insufficient. In this case, the operation abnormally ends at step S9 and the operation parameter optimization unit 18 issues an external notification of insufficient calculation precision by an indication of warning or an issuance of an alarm sound.

As mentioned above, according to the robot system 10 of the illustrated embodiment, the position and orientation of the sensor are calculated for each of the plurality of operation parameter sets by performing the predetermined operations by the robot using the plurality of operation parameter sets successively. Consequently, it is possible to obtain the optimum operation parameter set which minimizes the influence of disturbance applied to the acceleration sensor 13, from the plurality of operation parameter sets, and accordingly, the calculation precision of the position and orientation of the acceleration sensor can be enhanced. As a result, it is possible to fulfill the effect of reducing vibrations due to the aforementioned learning control.

Furthermore, according to the robot system 10 of the illustrated embodiment, it is possible to automatically judge whether or not the calculation result of the position and orientation of the acceleration sensor 13 is sufficient, and accordingly, a manual operation to confirm the precision of the calculation result is unnecessary.

In the present invention, the sensor which is attached to the portion of the robot 11 whose position is to be controlled is not limited to the acceleration sensor 13. Namely, in the aforementioned embodiment, the acceleration sensor 13 is attached to the tool 14 at the tip of the arm portion 11a of the robot 11, but in the present invention, the sensor to be attached may be any sensor which can monitor the vibration of the portion of the robot 11 whose position is to be controlled. As such a sensor, for example, a device which can measure the position or displacement, such as an acceleration sensor, a gyro sensor, an inertia sensor, force sensor, a laser tracker, a camera, or motion capture device can be applied. Moreover, when such a device is applied, the acceleration may be calculated based on the data measured by a computer.

Although the present invention has been discussed above with reference to the representative embodiments, it will be understood by a person skilled in the relevant art that the aforementioned modifications, a variety of other modifications, changes, omission, and addition can be made without departing from the scope of the present invention.

EFFECT OF THE INVENTION

According to the present invention, the position and orientation of the sensor are calculated for each of a plurality of combinations in which the predetermined types of operation parameters were combined at different values, by performing the predetermined operations by the robot using the combinations of the operation parameters. Consequently, it is possible to select the optimum combination of operation parameters which minimizes the influence of disturbance applied to the sensor, from the plurality of combinations of the operation parameters, and accordingly, the precision of the calculation result of the position and orientation of the sensor can be enhanced. As a result, the effect of reducing the vibrations due to the aforementioned learning control can be advantageously achieved.

Furthermore, according to the present invention, since it is possible to automatically judge whether or not the calculation precision of the position and orientation of the sensor is sufficient, no manual operation to confirm the calculation precision is necessary.

What is claimed is:

1. A robot system comprising a robot having a movable part to which a sensor is attached to monitor at least vibrations, and a control device which controls the operation of the robot, wherein
the control device comprises a sensor coordinate system calculation unit which calculates a position and an orientation of the sensor by causing the robot to perform a predetermined operation, and
the sensor coordinate system calculation unit comprises an operation parameter optimization unit which is configured to obtain a combination most suitable for calculating the position and orientation of the sensor, from a plurality of combinations of modified values of a predetermined type of operation parameters, by making the robot perform the predetermined operation, successively using each of the combinations, and wherein
the operation parameter optimization unit is configured to calculate the position and orientation of the sensor based on data of a physical quantity representing the vibrations, the data output from the sensor when the predetermined operation is performed by the robot in accordance with each of the combinations, and calculate the physical quantity acting on the sensor based on the calculated position and orientation of the sensor and on the position and posture of the robot during the predetermined operation, and determine a combination in which the calculation precision of the position and orientation of the sensor becomes the highest, from the plurality of combinations, based on the data output from the sensor and the calculated physical quantity acting on the sensor.

2. The robot system according to claim 1, wherein the predetermined type of operation parameters includes speed and acceleration instructed to the robot by the control device.

3. A robot system comprising a robot having a movable part to which a sensor is attached to monitor at least vibrations, and a control device which controls the operation of the robot, wherein the control device comprises a sensor coordinate system calculation unit which calculates a position and an orientation of the sensor by causing the robot to perform a predetermined operation, and the sensor coordinate system calculation unit comprises an operation parameter optimization unit which is configured to obtain a combination most suitable for calculating the position and orientation of the sensor, from a plurality of combinations of modified values of a predetermined type of operation parameters, by making the robot perform the predetermined operation, successively using each of the combinations, and wherein the operation parameter optimization unit is configured to calculate the position and orientation of the sensor based on data of a physical quantity representing the vibrations, the data output from the sensor when the predetermined operation is performed in accordance with each combination, and calculate a physical quantity acting on the sensor based on the calculated position and orientation of the sensor and on the position and posture of the robot during the predetermined operation, determine a combination in which the calculation precision of the position and orientation of the sensor becomes the highest, from the plurality of combinations, based on the data output from the sensor and the calculated physical quantity acting on the sensor, and judge whether or not the calculation precision of the position and orientation of the sensor is sufficient, and if the calculation precision is judged to be insufficient, issues an external notification.

4. The robot system according to claim 1, wherein the predetermined operation comprises translations in at least two axial directions of the X, Y and Z axes of a three dimensional orthogonal coordinate system defined at the movable part and rotations about at least two of the X, Y and Z axes.

5. The robot system according to claim 1, wherein the sensor is an acceleration sensor, a gyro sensor, an inertia sensor, a force sensor, a laser tracker, or a motion capture device.

* * * * *